(12) United States Patent
Na et al.

(10) Patent No.: US 9,304,737 B2
(45) Date of Patent: Apr. 5, 2016

(54) ELECTRONIC DEVICE AND METHOD OF CONTROLLING THE SAME

(71) Applicant: LG ELECTRONICS INC., Seoul (KR)

(72) Inventors: Sungchae Na, Seoul (KR); Jieun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 14/100,581

(22) Filed: Dec. 9, 2013

(65) Prior Publication Data

US 2014/0208209 A1    Jul. 24, 2014

(30) Foreign Application Priority Data

Jan. 23, 2013  (KR) ................. 10-2013-0007461

(51) Int. Cl.
| | |
|---|---|
| *G06F 3/16* | (2006.01) |
| *G10L 15/22* | (2006.01) |
| *G06F 3/0488* | (2013.01) |
| *G06F 17/24* | (2006.01) |
| *G06F 3/023* | (2006.01) |

(52) U.S. Cl.
CPC ............. *G06F 3/167* (2013.01); *G06F 3/0236* (2013.01); *G06F 3/0488* (2013.01); *G06F 17/24* (2013.01); *G10L 15/22* (2013.01)

(58) Field of Classification Search
CPC ...................................... G06F 17/24
USPC ......................................... 715/728
See application file for complete search history.

(56) References Cited

U.S. PATENT DOCUMENTS

| | | | | |
|---|---|---|---|---|
| 5,909,667 | A | * | 6/1999 | Leontiades et al. ........... 704/275 |
| 7,149,970 | B1 | | 12/2006 | Pratley et al. |
| 8,095,364 | B2 | * | 1/2012 | Longe et al. .................. 704/257 |
| 2004/0153321 | A1 | | 8/2004 | Chung et al. |
| 2008/0316212 | A1 | | 12/2008 | Kushler |
| 2009/0210229 | A1 | | 8/2009 | Amento et al. |
| 2010/0090971 | A1 | | 4/2010 | Choi et al. |
| 2010/0180197 | A1 | * | 7/2010 | Ohashi ......................... 715/256 |
| 2010/0205537 | A1 | * | 8/2010 | Knighton et al. ............. 715/751 |
| 2012/0016671 | A1 | | 1/2012 | Jaggi et al. |

FOREIGN PATENT DOCUMENTS

| | | |
|---|---|---|
| JP | 2004-213016 A | 7/2004 |
| JP | 2007-3669 A | 1/2007 |
| JP | 2012-8375 A | 1/2012 |
| JP | 2012-181358 A | 9/2012 |

* cited by examiner

*Primary Examiner* — William Titcomb
(74) *Attorney, Agent, or Firm* — Birch, Stewart, Kolasch & Birch, LLP

(57) ABSTRACT

An electronic device including a touchscreen; a voice recognition module; and a controller configured to receive a voice input through the voice recognition module when the voice recognition module has been activated, convert the voice input into text, display an object indicator for editing a preset word included in the text, receive a selection of the object indicator, provide an editing option for changing the displayed object indicator into new text to be displayed on the touchscreen, and display the new text when the editing option is selected.

18 Claims, 23 Drawing Sheets

FIG. 16c

Agricultural * products

ELECTRONIC DEVICE AND METHOD OF CONTROLLING THE SAME

CROSS-REFERENCE TO RELATED APPLICATIONS

Pursuant to 35 U.S.C. §119(a), this application claims the benefit of the earlier filing date and right of priority to Korean Patent Application No. 10-2013-0007461, filed on 23 Jan., 2013, the contents of which are incorporated by reference herein in their entirety.

FIELD OF THE INVENTION

The present invention generally relates to an electronic device equipped with a speech recognition function, and more particularly to editing a voice recognition result on an electronic device.

RELATED ART

With the rapid development of hardware and software technologies relating to various electronic devices including a mobile terminal, electronic devices can provide various kinds of information to users at high speeds.

In particular, the users need to memorize complicated key sequences and menu hierarchies and enter keys, in order to execute a variety of functions on electronic devices. However, memorizing a plurality of key sequences and menu hierarchies is time-consuming, and there are some difficulties in activating a desired function by pressing a predetermined key.

Related art electronic devices do not provide a simple and intuitive way to edit text and graphics. Accordingly, there is a need for the development of user interfaces that allow electronic devices equipped with a voice recognition function to recognize a user's voice, edit the user's voice in various ways, and apply it.

SUMMARY OF THE INVENTION

An aspect of the present invention is to provide an electronic device for reducing or eliminating the aforementioned problems associated with user interfaces for electronic devices with touchscreens.

Another aspect of the present invention is to provide an electronic device for editing a voice recognition result in a more convenient way and applying it, and a method of controlling the electronic device.

An embodiment of the present invention provides an electronic device including: a touchscreen; a voice recognition module; and a controller configured to receive a voice input through a voice recognition module when the voice recognition module has been activated, convert the voice input into text, and upon recognizing a preset word while displaying the converted text on the touchscreen, display an object serving as a guide to editing the preset word at a location where the preset word is recognized.

The preset word may include a word corresponding to at least one of a long syllable, a voiceless sound, audio (e.g., an acoustic signal input from a user to perform a particular operation), which is hard to express through voice input, a noun, and a verb.

The controller may be configured to display the object on the touchscreen for a predetermined amount of time.

The controller is configured to delete the object from the touchscreen after the predetermined amount of time has passed.

The controller may be configured to display, on the touchscreen, a window containing at least one of a symbol, special character, and a graphics object that can be inserted at the location where the preset word is recognized, upon receiving an input for selecting the object.

The input for selecting the object may include a zoom-out input by a multi-touch on the object, and the controller may be configured to expand the space between first and second words and insert at least one of the symbol, special character, and graphics object in the expanded space, upon receiving a zoom-out input at a location between the first and second words of the converted text.

The controller may be configured to arrange and display at least one of the symbol, special character, and graphics object in the window, according to a predetermined priority order.

The symbol, special character, and graphics object each may be indicated by a corresponding index, and the controller may be configured to edit the text corresponding to the index, upon receiving a voice input indicating the index.

The controller may be configured to auto-complete a character that can be inserted at the location where the object is displayed, upon receiving a predetermined touch input on the object.

The controller may be configured to display a plurality of candidate words on the touchscreen if a plurality of characters are to be inserted by auto-completion.

The controller may be configured to enter a mode for converting the voice input into text, activate the voice recognition mode in the mode, and upon receiving a touch input for selecting at least a part of the converted text, deactivate the voice recognition mode and enter a mode for editing the selected text part.

The controller may be configured to modify the attributes of the object according to patterns of the received voice input.

Another embodiment of the present invention provides a method for controlling an electronic device, the method including: activating a voice recognition module; receiving a voice input through the voice recognition module; converting the voice input into text; and upon recognizing a preset word while displaying the converted text on a touchscreen, displaying an object for editing the preset word at the location where the preset word is recognized.

Details of other embodiments are included in the detailed description and drawings.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
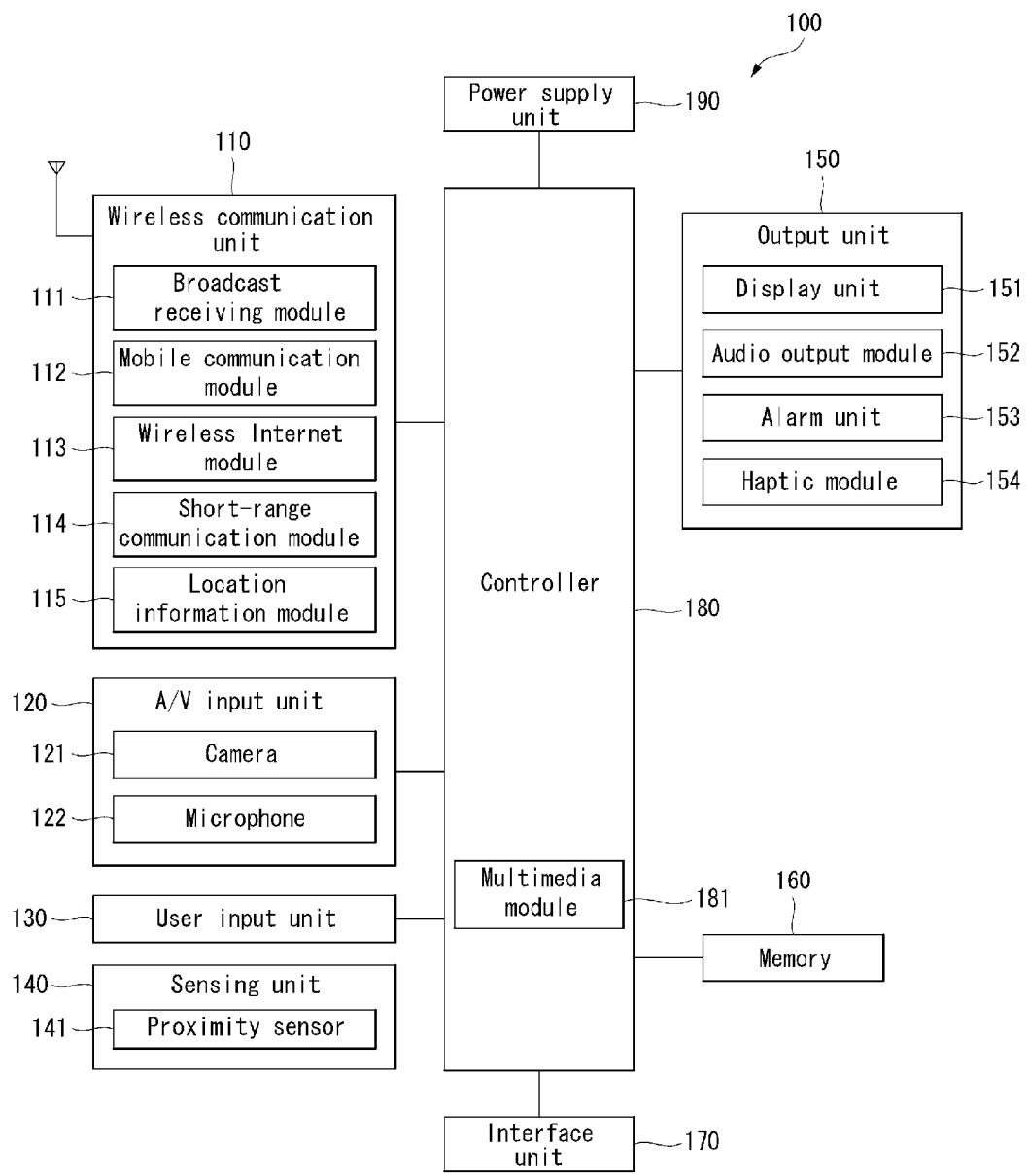
FIG. 1 is a block diagram of a mobile terminal according to an embodiment of the invention.

Referring to FIG. 1, a mobile terminal 100, as an example of the electronic device 100 related to this invention, is described in detail with reference to the accompanying drawings. FIG. 1 is a block diagram of the mobile terminal according to an embodiment of this invention. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a position-location module 115. For non-mobile terminals, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position-location module 115 identifies or otherwise obtains a location of the mobile terminal 100. The position-location module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position-location module 115 is a GPS module. The position-location module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The position-location module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller. The touch controller processes the signal(s) and then transfers corresponding data to the controller 180. The controller 180 can determine, therefore, which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The controller 180 (FIG. 1) recognizes the proximity touch as one of various input signals according to proximity depth and position of the pointer. The controller 180 performs various operation controls according to various input signals.

Referring again to FIG. 1, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 can include a multimedia module 181 that provides multimedia playback. The multimedia module 181 may be configured as part of the controller 180 or may be configured as a separate component. The controller 180 can also perform pattern recognizing processing for recognizing a handwriting input performed on the touch screen as a character and/or recognizing a picture drawing input performed on the touch screen as characters or images.

The power supply unit 190 provides power required by the various components for the mobile terminal 100. The power may be internal power, external power, or combinations thereof.

Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 2:
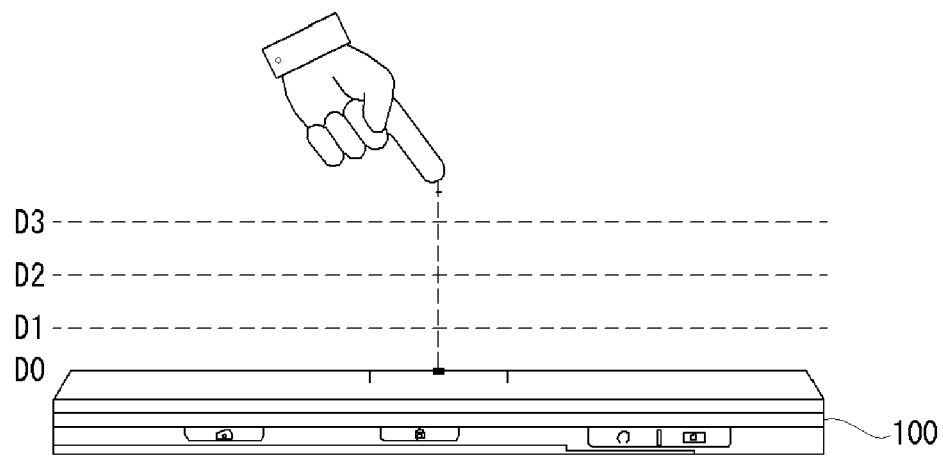
FIG. 2 is a view illustrating a proximity depth of a proximity sensor.

Next, FIG. 2 is a view illustrating a proximity depth of a proximity sensor. As shown in FIG. 2, when a pointer (such as a user's finger) approaches the touch screen, the proximity sensor 141 located inside or near the touch screen may sense the approach of the pointer, and may output a proximity signal.

The proximity sensor 141 may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 2 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth.

When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 can recognize the proximity touch as various input signals according to proximity distance and proximity position of the pointer with respect to the touch screen, and the controller 810 may perform various operation controls according to the input signals.

Hereinafter, exemplary embodiments of the present invention will be described.

In the present invention, the display unit 151 is assumed to include a touchscreen 151, for convenience of description. As described above, the touchscreen 151 may perform both functions of displaying and inputting information. However, the present invention is not limited thereto. Furthermore, the touch described in this specification may include both the contact touch and the proximity touch. The description may be made on the assumption that the display module 230 of the external device 200 is also a touchscreen.

Figure 3:
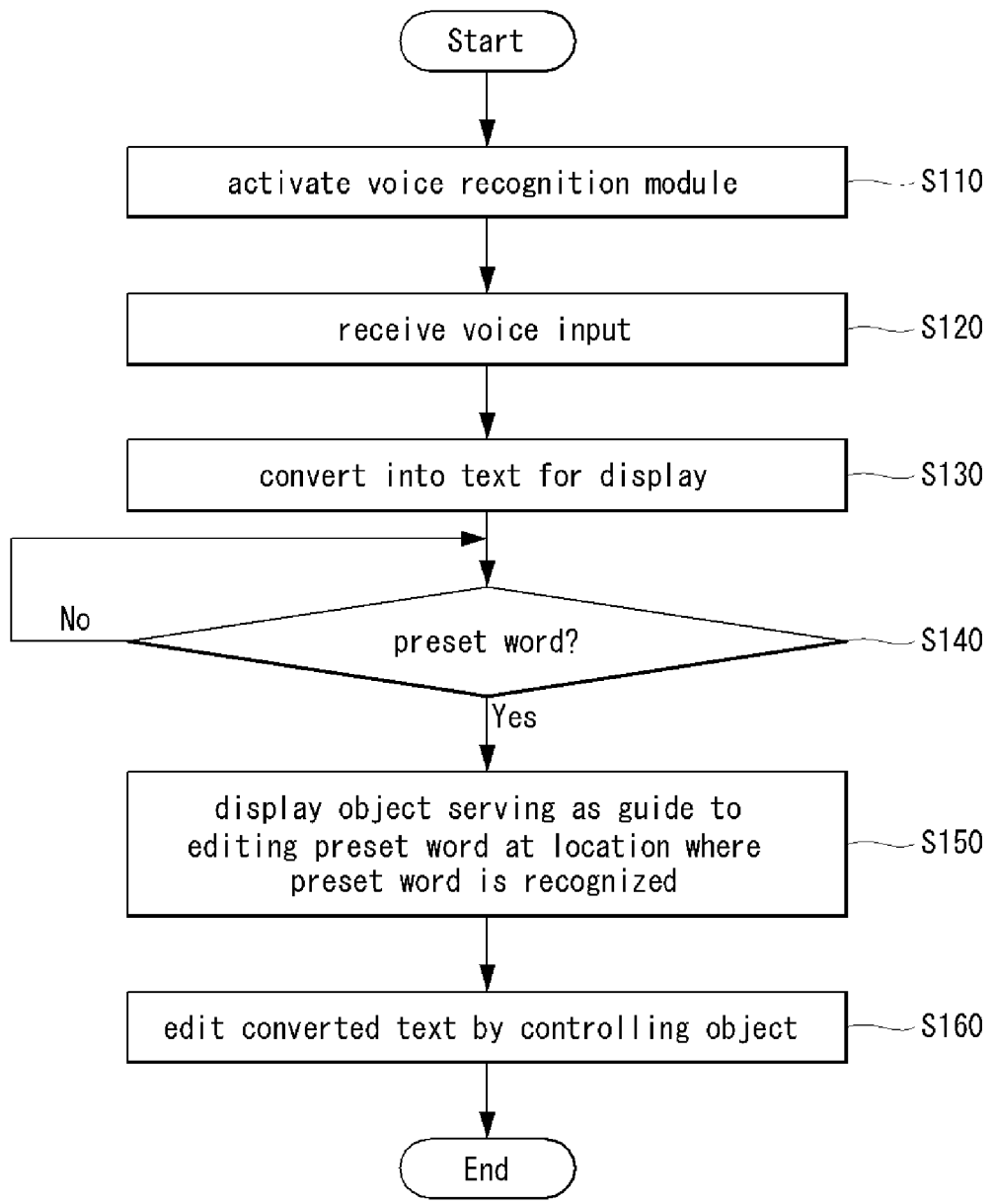
FIG. 3 is a flowchart of a method of controlling an electronic device according to an embodiment of the present invention.

Next, FIG. 3 is a flowchart of a method of controlling an electronic device according to an embodiment of the present invention. The method of controlling an electronic device according to an embodiment of the present invention may be implemented by the electronic device 100 explained with reference to FIG. 1.

As shown in FIG. 3, the controller 180 of the electronic device 100 activates a voice recognition module (S110). When the voice recognition module is activated, a voice input spoken by the user can be received (S120).

Further, the voice recognition module is connected to the microphone 122 of FIG. 1 and recognizes voice input through the microphone 122. The voice recognition module can be activated by executing a natural language recognition application. If the application is executed, the microphone 122 is automatically turned on.

The voice recognition module may be connected to a natural language database so as to recognize the content of an utterance by the user. For example, the natural language database determines if any of the voice inputs from the user matches text stored in the natural language database. If it finds a matching voice, the content of the utterance by the user is regarded as the content of text stored in the database.

A voice input received after the activation of the voice recognition module may include voice spoken by the user and an audio file stored in the electronic device 100. Afterwards, the controller 180 can convert a voice input, recognized in real time when the voice recognition module is in activated state, into text, and display the converted text on the touchscreen 151.

The controller 180 determines whether or not the converted text is a preset word (S140). If the preset word exists in the converted text displayed on the touchscreen 151 (Yes in S140), the controller 180 then may display an object serving as a guide to editing the preset word at a location where the preset word is recognized (S150).

As used herein, the preset word may be set in advance by the user. For example, if a user's voice input in real time is a long syllable, the long syllable can be recognized and edited, based on the preset word. Also, if the preset word is a certain part of speech, editing related to that part of speech can be performed.

The preset word is not limited to the aforementioned prolonged sound or certain part of speech. For example, if a certain letter, symbol, special character, etc. preset by the user is recognized, the controller 180 is put into operation to perform editing according to an embodiment of the present invention.

Also, if a voiceless sound, applause sound, or the like, which is hard to convert into text, is recognized through a voice recognition module, the controller 180 can enter a mode for editing text currently in conversion. Meanwhile, the controller 180 can substitute the voiceless sound or applause sound with a symbol and display the symbol because the voiceless sound or applause sound cannot be converted into text.

The controller 180 can also edit the converted text by manipulating the object serving as a guide to editing the converted text. The object may be displayed on the touchscreen 151 in the form of a cursor that indicates where text to be edited is positioned. The object also may be displayed as a graphics object.

Further, the shape of the object may be modified by a user's touch input. For example, after an object having a predetermined width is displayed, the width of the object may be increased by a user's zoom-out input. The object may be displayed on the touchscreen 151 for a predetermined amount of time, and the object may automatically disappear from the touchscreen 151 after the predetermined amount of time has passed.

That is, the text edit mode is considered active while the object is being displayed on the touchscreen 151. Accordingly, when the object disappears from the touchscreen 151, the controller 180 can switch from the text edit mode back to the voice input mode.

According to the above-described embodiment, while converting a voice input spoken by the user into text in real time, the electronic device 100 can edit the converted text in real time by a user's touch input. Meanwhile, the electronic device 100 can send text message by inputting characters through voice input and modifying the input characters in various ways, which is advantageous over the related art character input method.

When the user's voice input is converted into text, the controller 180 can consider context awareness such as the user's speech pattern, emotion, intonation, speech time, location, etc. Thus, according to an embodiment of the present invention, while converting a voice spoken by the user, context may be applied to the converted text automatically or manually by the user.

While an example of context application according to an embodiment of the present invention has been described with respect to text editing, the present invention is not limited thereto but various modifications can be made.

Figure 4:
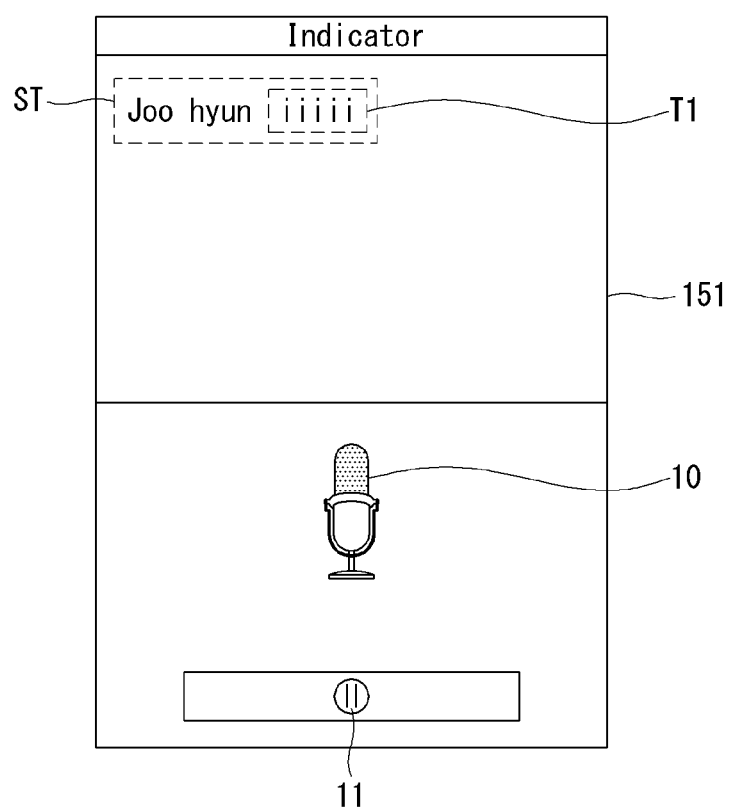
FIGS. 4 and 5 are views illustrating an example of displaying an object serving as a guide for editing text when a preset word is recognized.
Figure 5:
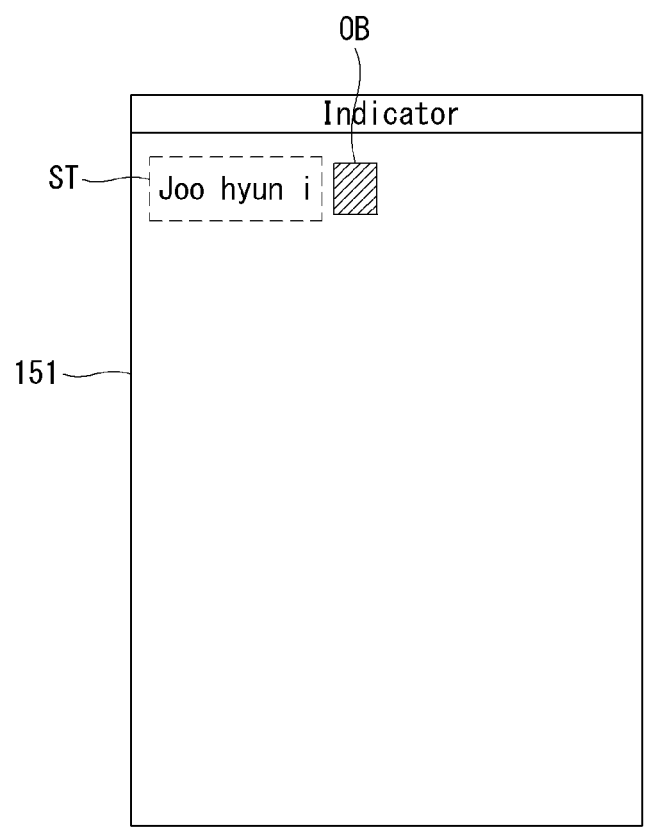

Next, FIGS. 4 and 5 are views illustrating an example of displaying an object serving as a guide for editing text when a preset word is recognized. Referring to FIG. 4, when the voice recognition module is activated, the controller 180 displays a user interface for detecting a voice input being spoken by the user, for example, a microphone-like graphics object 10 and an object 11 indicating that voice is being input, in an area of the touchscreen 151.

The controller 180 receives voice spoken by the user, converts it into text, and displays the converted text ST on the touchscreen 151. Upon recognizing a prolonged sound T1 in the voice, the controller 180 displays an object OB for automatically or manually editing the long syllable (e.g., "i i i i" in FIG. 4) such that an object OB is displayed after the recognized long syllable, as illustrated in FIG. 5.

In particular, when a special character that is difficult to be input by a user's voice, and when a preset long syllable is spoken, the controller 180 displays an object OB near the long syllable that can be used or selected to alter the long syllable into other characters. Also, a desired character, letter, etc. may be inserted or modified by manipulating the object OB.

Figure 6:
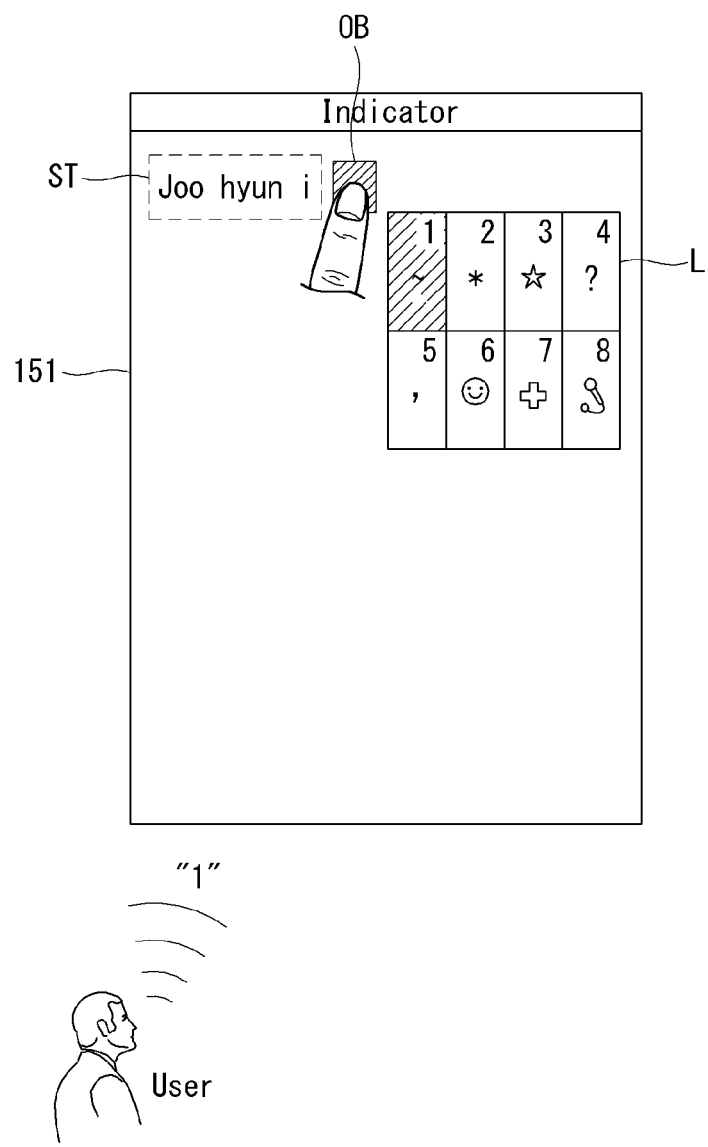
FIGS. 6 and 7 are views illustrating an example of editing text using the object of FIG. 5.
Figure 7:
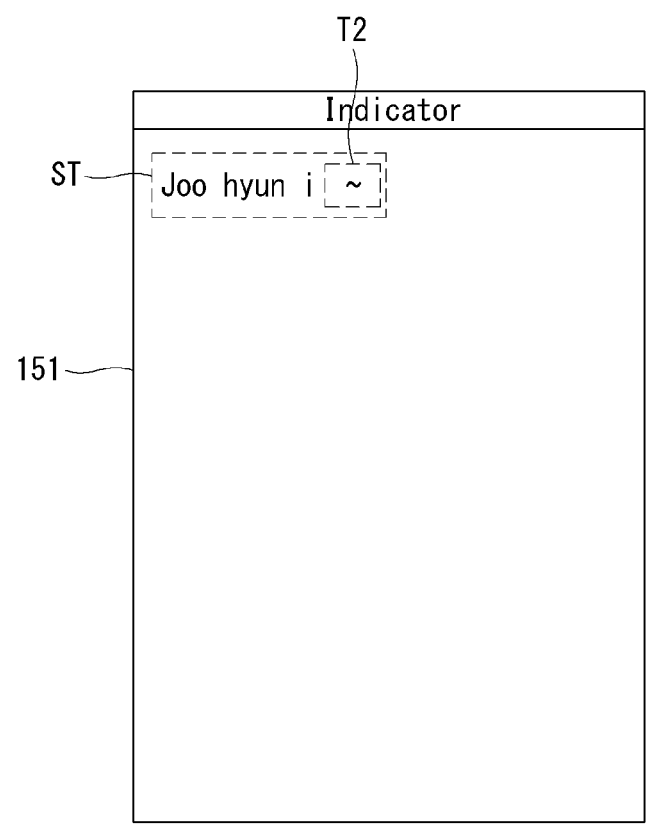

Next, FIGS. 6 and 7 are views illustrating an example of editing text using the object of FIG. 5. Referring to FIG. 6, when a long syllable is input by a user's voice, the controller 180 displays the object OB next to the text ST converted from the user's voice. Then, upon receiving an input for selecting the object OB, the controller 180 displays on the touchscreen 151 a list L of candidate symbols or candidate characters to replace the long syllable or to be inserted next to the long syllable.

The controller 180 can monitor special characters, character input patterns, etc. frequently used by the user, and cumulatively convert the user's character input patterns into data. The controller 180 can recommend the candidate symbols or candidate characters to be inserted into the object OB with reference to the user's character input patterns.

As described above, the list L may include special characters, symbols, and predetermined graphics objects that are hard to input through user's voice input. The symbols and characters in the list L may be indexed with numerals. For example, the tilde "~" may be indexed with the numeral "1", the asterisk "*" may be indexed with the numeral "2", and the star may be indexed with the numeral "3". The other symbols and characters may be likewise indexed with the numerals "4", "5", "6", "7" and "8".

Referring to FIG. 6, when the list L is displayed on the touchscreen 151, and if the controller 180 receives a voice input including a numeric index, the controller 180 replaces the object OB with a symbol or character corresponding to the numeral.

A method for selecting a symbol or character in the list L may be implemented in various ways other than the above-described voice input method from the user. For example, the user may select a hard key on the electronic device 100 or a soft key button displayed on the touchscreen 151.

Referring to FIG. 7, if the user speaks the numeral "1" in FIG. 6, the tilde "~" T2 corresponding to "1" replaces the object OB. That is, according to an embodiment of the present invention, even special symbols or characters that are hard to receive through user's voice can be input as text more conveniently.

According to an embodiment of the present invention, if the content spoken by the user is "Joo hyun i tilde", the controller 180 can convert the part corresponding to "Joo hyun i" in the spoken content into text and automatically convert the other part corresponding to "tilde" into the symbol "~" corresponding to the tilde.

Next, FIGS. 8 to 11 are views illustrating an example of editing text in consideration of the attributes of converted text. According to an embodiment of the present invention, when a user's voice is converted into text in consideration of user's character input patterns, if the converted text is identical to the characters of a frequently-used pattern, the controller 180 can edit the text by controlling the above-described object OB serving as a guide for editing text. The characters of the frequently-used pattern are obtained by continuously monitoring the user's character input patterns by a preset program and storing monitored results in a database.

The character input patterns monitored by the program may include special characters, symbols, and so on that are input after a specific word. Other things to be monitored may include the frequency of a specific word.

Figure 8:
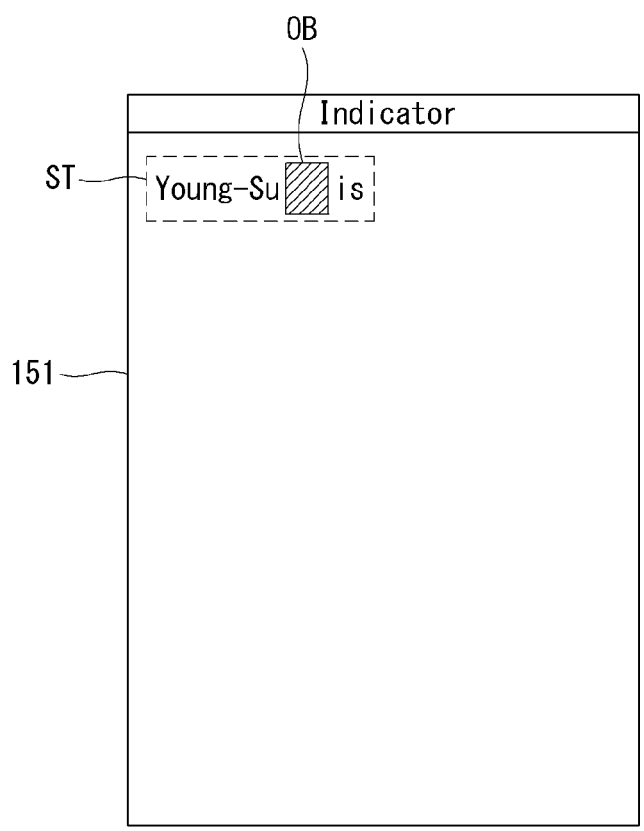
FIGS. 8 to 11 are views illustrating an example of editing text in consideration of the attributes of converted text.
Figure 9:
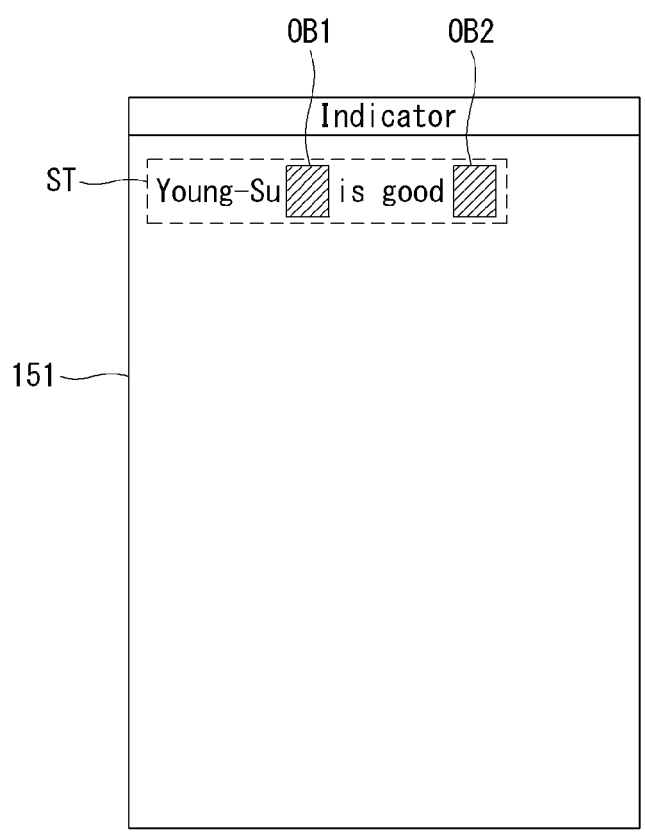

For example, referring to FIG. 8, the controller 180 receives a specific word spoken by a user, and displays an object OH serving as a guide for editing text next to the specific word as soon as it recognizes the specific word (e.g., "Young-Su"), while converting the user's utterance into text and displaying it on the touchscreen 151 in real time.

In addition, a plurality of objects OB for guiding text editing may be provided. That is, referring to FIG. 9, if the words "Young-Su" and "is good" are preset words, the controller 180 can match the words to the objects OB serving as a guide for editing text, respectively. That is, the first object OB1 can be displayed to edit "Young-Su", and the second object OB2 can be displayed to edit "is good".

The first object OB1 and the second object OB2 can also be sequentially displayed. Further, the first object OB1 and the second object OB2 each may disappear automatically after a predetermined amount of time has passed after they are displayed on the touchscreen 151. If a predetermined amount of time has passed after the objects are displayed, when there is no touch input on the objects, the objects may disappear automatically from the touchscreen 151.

Figure 10:
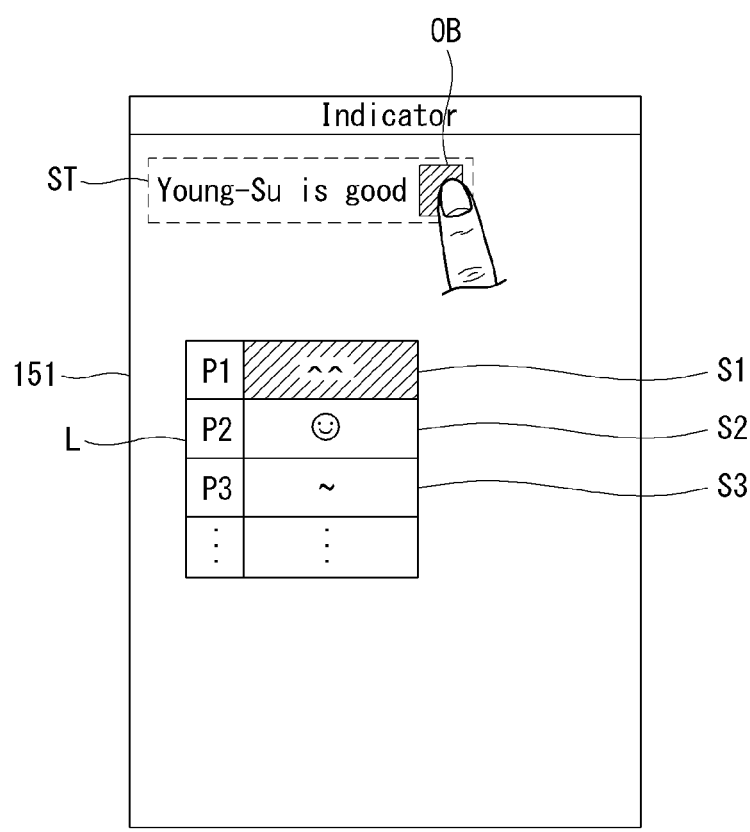

Referring to FIG. 10, upon receiving a touch input for selecting the object OB indicated near a specific one of the preset words in the converted text ST, the controller 180 can display a list L including a candidate item to replace the object OB on the touchscreen 151.

Figure 11:
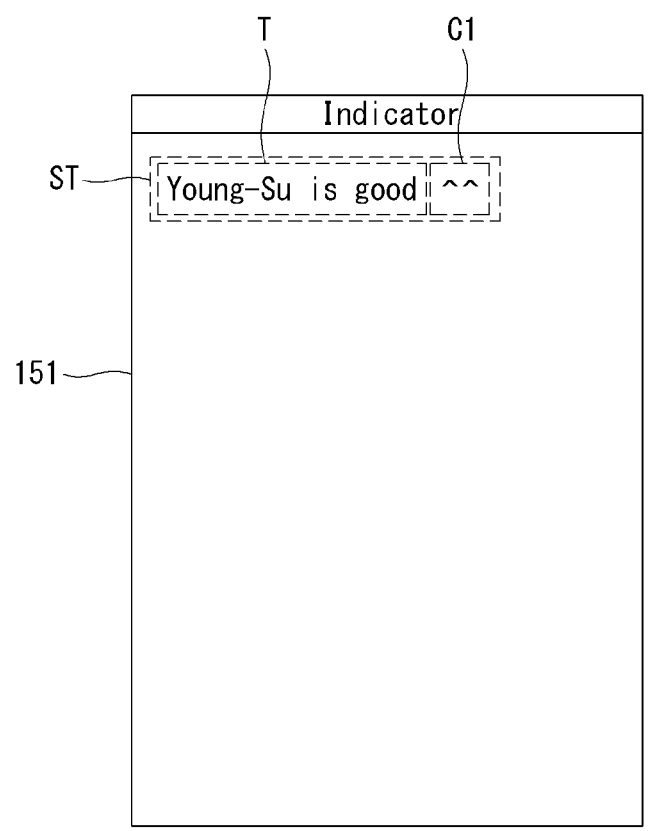

The list L may be arranged and displayed according to a predetermined priority order, taking frequency of use into account. Further, when any one item is selected from among at least one item shown in the list L, the controller 180 replaces the object OB with the selected item C1 as shown in FIG. 11.

Figure 12:
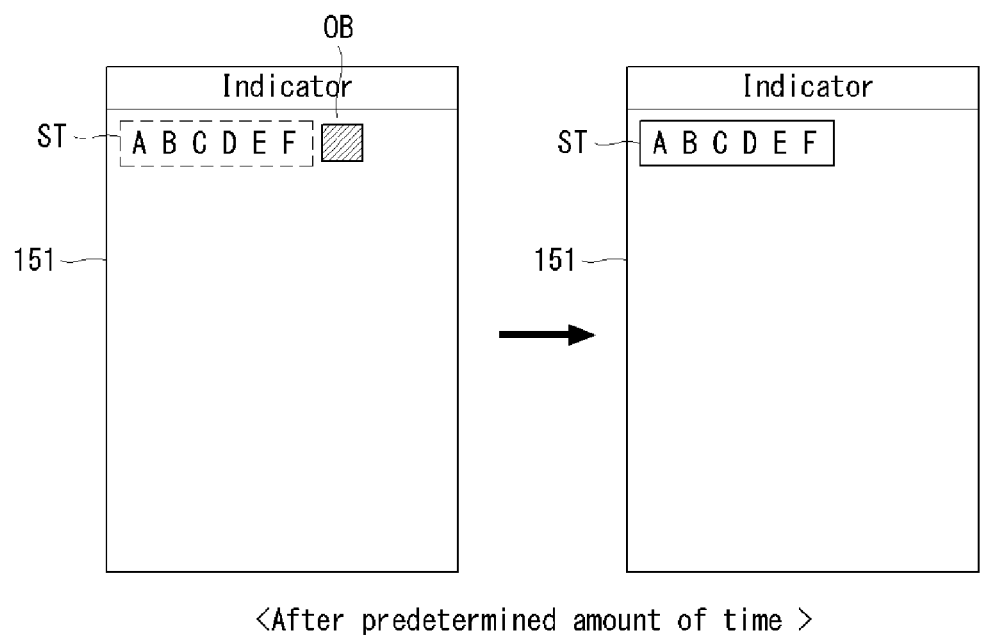
FIG. 12 is a view illustrating an example of displaying an object serving as a guide for editing text.

Next, FIG. 12 is a view illustrating an example of displaying an object serving as a guide for editing text. Referring to FIG. 12, when a user's voice is converted into text in real time and displayed on the touchscreen 151, and if a predetermined event occurs in the text, the controller 180 can display an object OB serving as a guide for editing the converted text on the touchscreen 151.

The predetermined event may include when a preset word is recognized, or when the controller 180 enters STT (Speech to Text) mode by receiving a predetermined input after the user's voice is input and converted into text, or when there exists no additional voice input from the user for a predetermined amount of time after the preceding text is displayed, while the user's voice recognized through the voice recognition module is being converted into text in real time and displayed on the touchscreen.

The predetermined event for displaying the object for editing the converted text after the user's voice input is not limited to the above-described example.

In addition, the controller 180 can automatically delete the object OB serving as a guide for editing text after a predetermined amount of time has passed after displaying the object OB near the converted text.

Once the object OB is displayed on the touchscreen 151, the controller 180 can temporarily deactivate the voice recognition mode. That is, the controller 180 can edit the converted text when the voice recognition mode is deactivated by manipulating the object OB. On the other hand, if the object OB disappears from the touchscreen 151, the controller 180 can automatically enter the voice recognition mode, receive the user's voice input, and recognize it.

Figure 13:
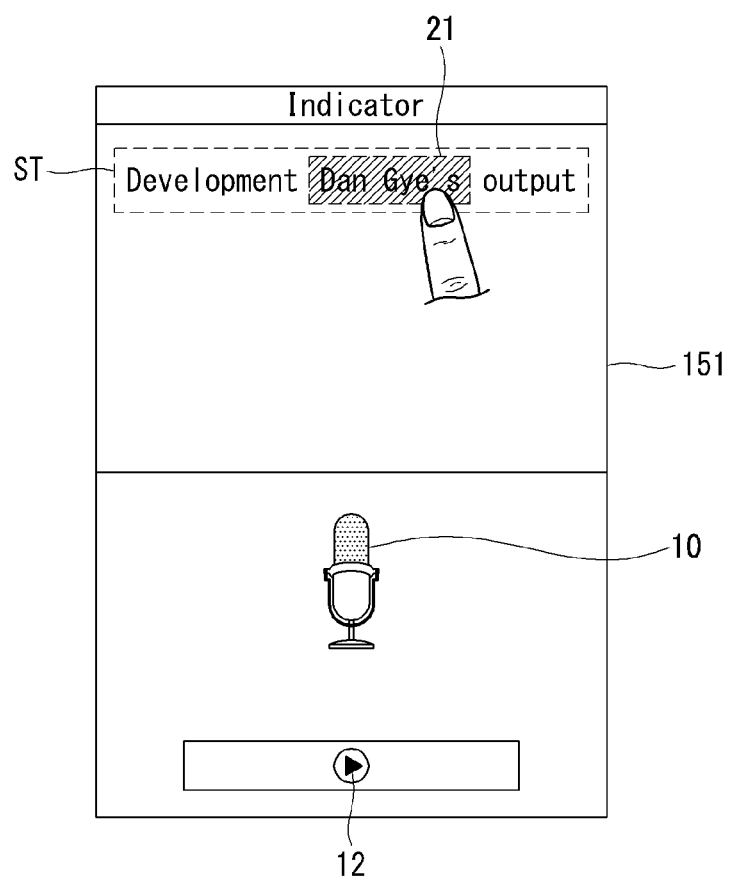
FIG. 13 is a view illustrating an example of selecting a text block to be edited from converted text.

Next, FIG. 13 is a view illustrating an example of selecting a text block to be edited from converted text. Referring to FIG. 13, the controller 180 receives a touch input on at least some word of the text ST converted from the user's voice. The controller 180 can also form a text block containing the word corresponding to the location where the touch input is received.

For example, the location in FIG. 13 where the user's touch input is received is "Gye", and the controller 180 recognizes "'Dan Gye's" containing "Gye" as a single text block and edits it on a per-text block basis. That is, the controller 180 can convert the user's voice into text while editing the text in real time, by implementing the foregoing embodiments on the formed text block.

Next, FIGS. 14 to 17c are views illustrating an example of inserting other text between words of converted text. In particular, according to this embodiment of the present invention, the text converted from the user's voice input can be edited by a multi-touch input.

That is, the multi-touch input may be a zoom-out input or zoom-in input. The multi-touch input may also be inserted between specific words in the converted text. Also, the user's voice input may be properly edited by a specific user manipulation through a user interface for inserting the multi-touch input between one of the specific word and the other specific word.

Figure 14:
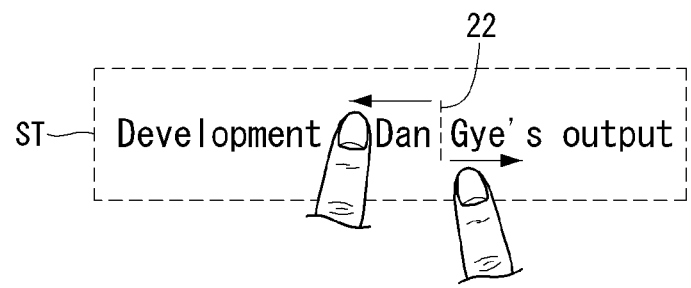
FIGS. 14 to 17c are views illustrating an example of inserting another text between words of converted text.

Referring to FIG. 14, the controller 180 receives a zoom-out input for expanding the space between the first word "Dan" and the second word "Gye" in the converted text ST. Upon receiving the multi-touch input on some part of the converted text Si, the controller 180 terminates the voice recognition mode, and enters the text edit mode.

Figure 15A:
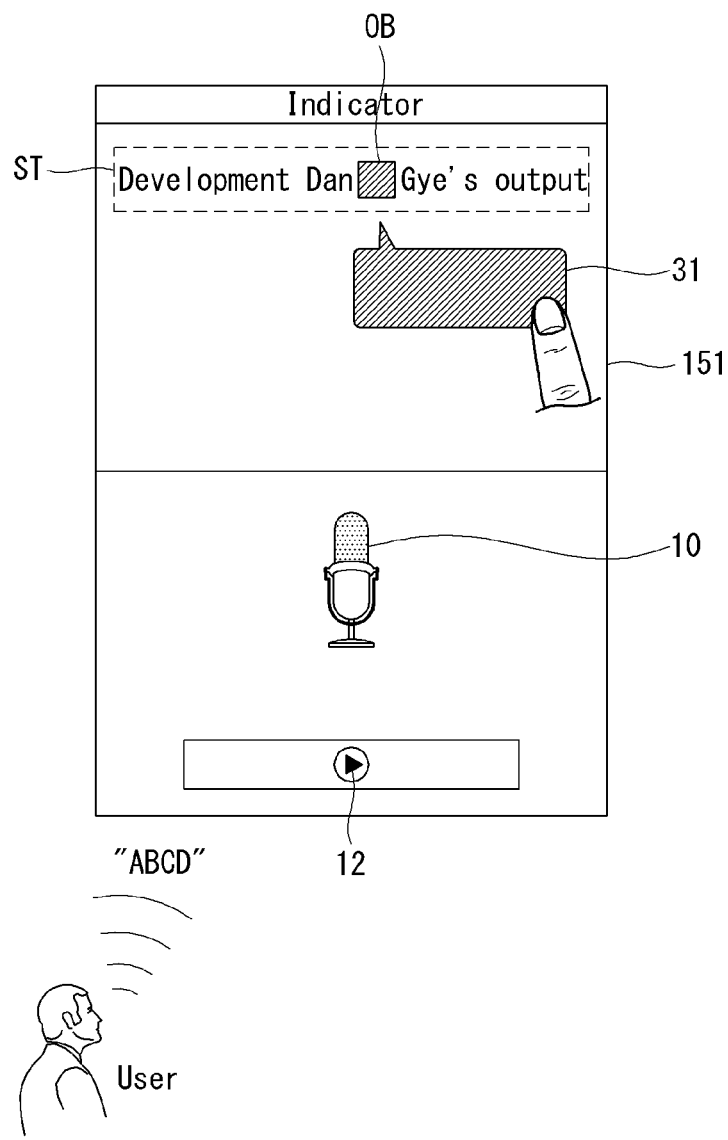

Referring to FIG. 15a, the controller 180 inserts an object OB serving as a guide for editing text in the space between the first word and the second word, in response to the zoom-out input. Moreover, the controller 180 can display, on the touchscreen 151, a user interface 31 for inputting text to be inserted between the first word and the second word.

Upon receiving a touch input on the user interface 31, the controller 180 can restart the voice recognition mode. Also, the controller 180 can display, on the touchscreen 151, an identifier 12 for identifying the restart of the voice recognition mode. In this instance, the controller 180 can restart the voice recognition mode while maintaining the touch input on the user interface 31 (e.g., an indication block for indicating the space where specific text is to be inserted).

Figure 15B:
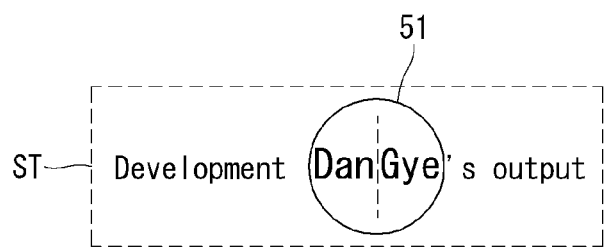
Figure 15C:
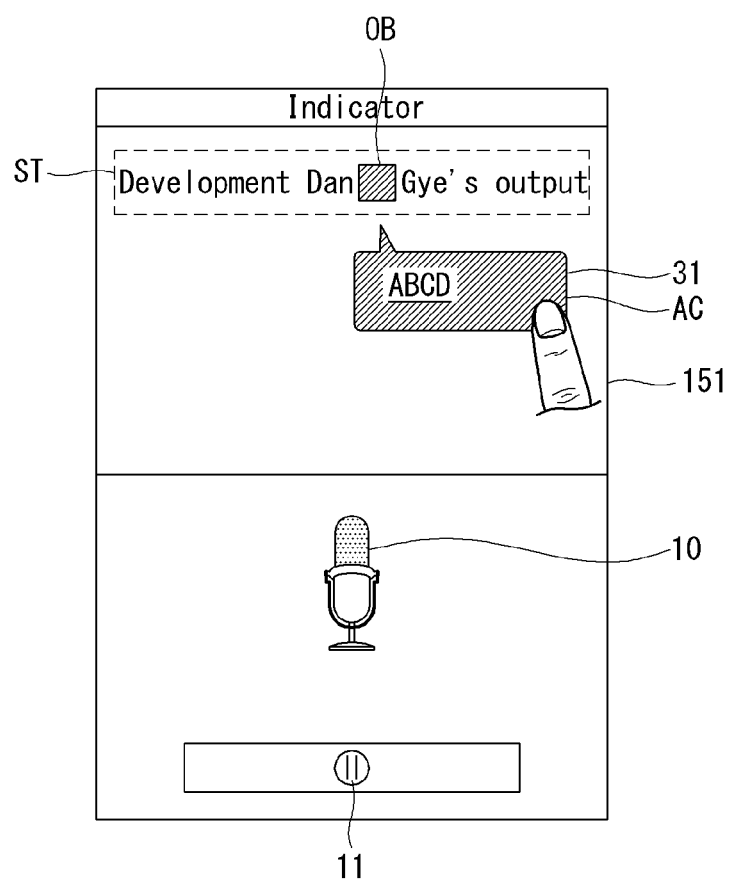
Figure 15D:
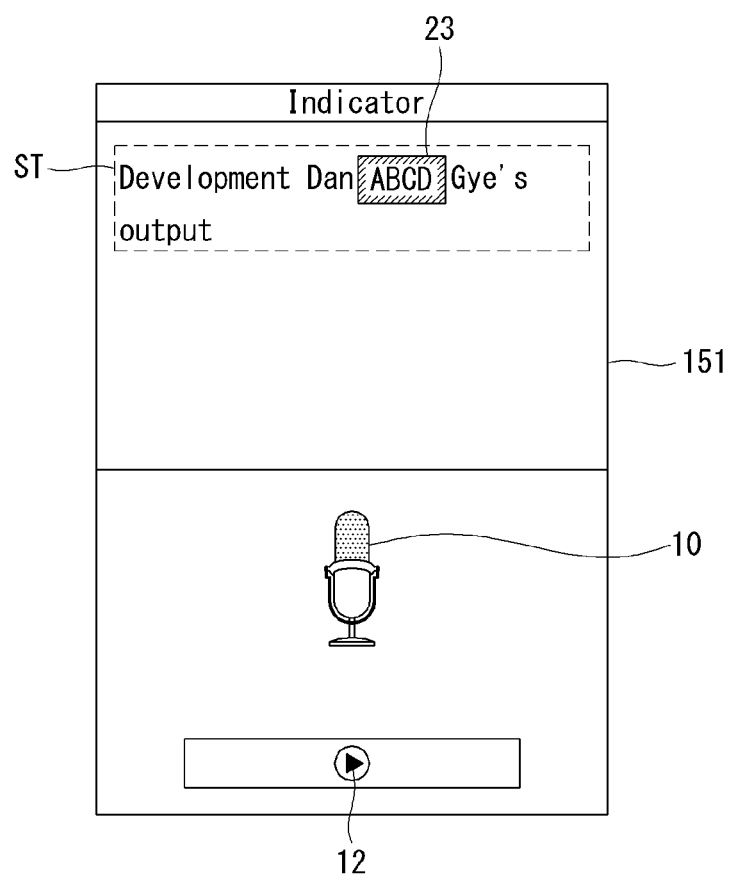

Accordingly, upon receiving a user's voice input "ABCD" while maintaining the touch input on the user interface 31, the controller 180 can convert the input voice into text and display the converted text on the user interface 31, as shown in FIG. 15c.

On the other hand, referring to FIG. 15c, if the touch input on the user interface 31 is released, the controller 180 can terminate the voice recognition mode and display a symbol 11 indicating the termination of the voice recognition mode. Thereafter, upon termination of the voice recognition mode, the controller 180 can insert text 23 through the use interface 23 at a location where the zoom-out input has been received.

Referring to FIG. 15b, upon receiving an input for selecting a specific word in the converted text ST, the controller 180 can display a magnifying window 51 on the touchscreen 151. The controller 180 can edit text by a user's touch operation on the magnifying window 51.

The above embodiments describe, after a user's voice input is converted into text, the user can easily edit text by a zoom-out input on a desired part of the converted text. However, FIGS. 16 to 17c are views illustrating another aspect of the above-explained embodiments.

Figure 16A:
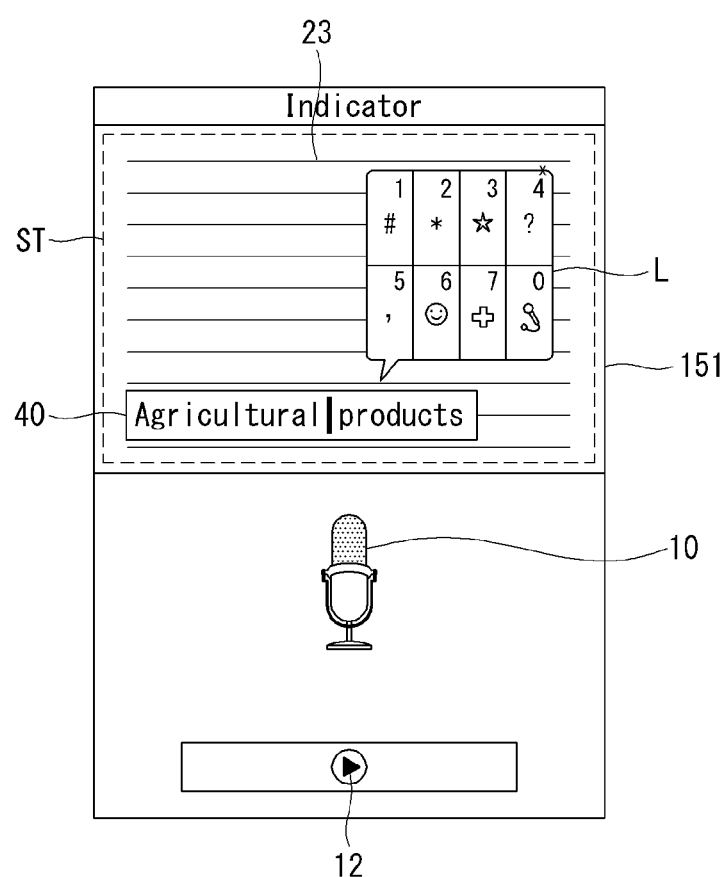

Referring to FIG. 16a, after receiving a user's voice, the controller 180 converts the voice into text. When the converted text is displayed on the touchscreen 115, the controller 180 can receive an input for selecting a particular word block 40 to be edited. Also, the controller 180 can place a bar 41 for inserting a predetermined character or symbol in the space between first and second words in the particular word block 40, and select a particular position while moving the bar 41 left and right.

Figure 16B:
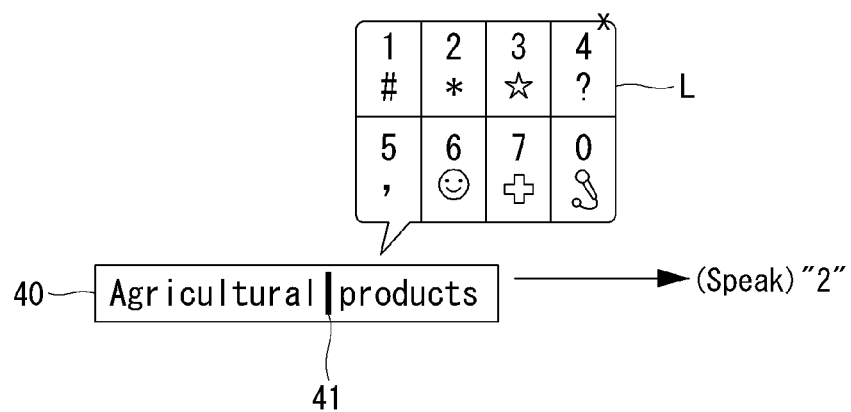
Figure 16C:
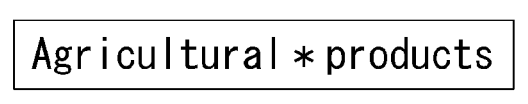

Once a particular position is selected, the controller 180 can display, on the touchscreen 151, a list L of at least one symbol or character to be inserted into the particular position. As shown in FIG. 16b, the at least one symbol or character in the list L is indexed with numerals. Upon receiving a voice input by which any one of the numeric indexes is spoken, the controller 180 inserts a symbol corresponding to the numeral input at the particular position (see FIG. 16c).

Figure 17A:
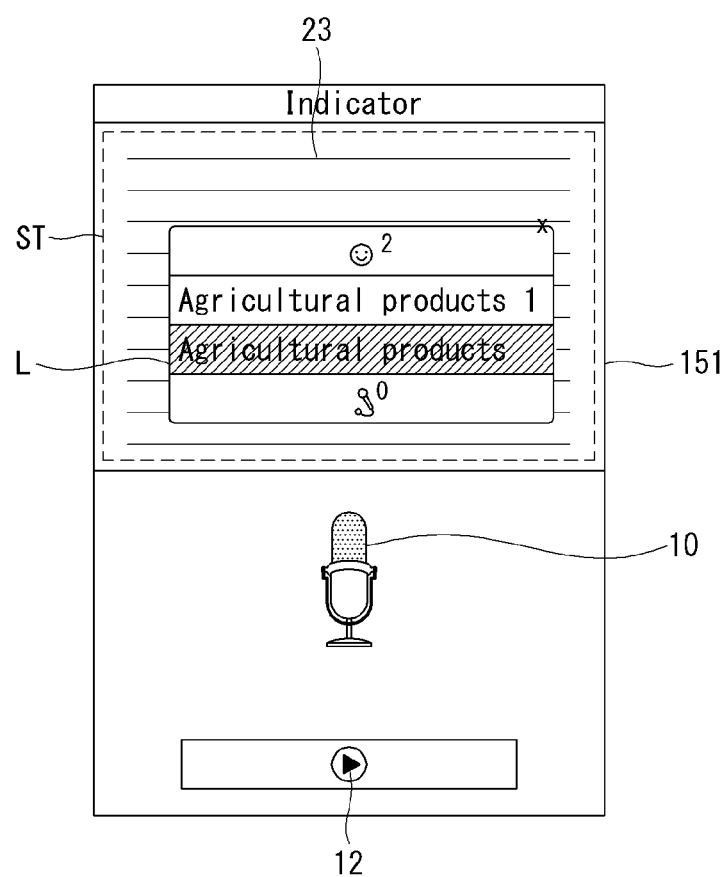
Figures 17B, 17C:
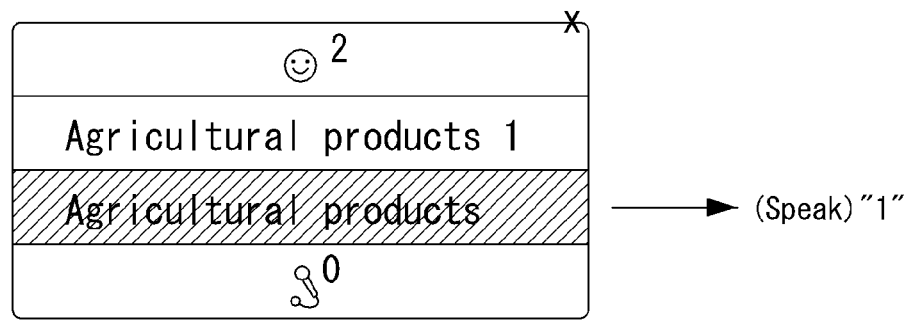

Referring to FIGS. 17a to 17c, the list L may contain a plurality of words that can be inserted. Therefore, according to an embodiment of the present invention, upon selecting a particular position in the text, after a user's voice input is converted into text, a plurality of candidate words that can be inserted at the particular position can be recommended.

Upon receiving an input (e.g., a voice input "1") for selecting any one of the recommended candidate words, the controller 180 can insert and display that specific one of the plurality of candidate words at the particular position, as shown in FIG. 17c.

According to an embodiment of the present invention, upon receiving a predetermined input (e.g., a touch input on the converted text) which is considered to be given by the user for an editing purpose, the controller 180 can analyze the context of the text and insert an appropriate word using an auto-completion function.

According to an embodiment of the present invention, candidates that can be auto-completed may be displayed on the touchscreen 151, and an item selected by the user may be inserted by auto-completion.

The method for controlling of the mobile terminal according to embodiments of the present invention may be recorded in a computer-readable recording medium as a program to be executed in the computer and provided. Further, the method for controlling a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD, ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An electronic device comprising:
   a touchscreen;
   a voice recognition module; and
   a controller configured to:
   receive a voice input through the voice recognition module when the voice recognition module has been activated,
   convert the voice input into text and display the converted text on the touchscreen,
   display an object indicator for editing a preset word included in the text upon recognizing the preset word while displaying the converted text on the touchscreen, wherein the preset word includes a prolonged sound,
   wherein the object indicator is a graphic user interface (GUI) serving as a guide for editing the preset word, and is displayed at a location where the preset word is recognized,
   receive an input for selecting the object indicator,
   provide an editing option for changing the displayed object indicator into a new text to be displayed on the touchscreen, and
   display the new text when the editing option is selected, the new text including a symbol corresponding to the prolonged sound.

2. The electronic device of claim 1, wherein the controller is further configured to display the object indicator at a location on the touchscreen corresponding to where the preset word was recognized by the controller.

3. The electronic device of claim 2, wherein the controller is further configured to display a window including at least one of a symbol, special character, and a graphics object to be inserted at the location where the object indicator is displayed.

4. The electronic device of claim 3, wherein the controller is further configured to arrange and display said at least one of the symbol, special character, and graphics object in the window according to a predetermined priority order.

5. The electronic device of claim 3, wherein the controller is further configured to:
   display an index next to each symbol, special character, and graphics object, and
   insert a corresponding symbol, special character or graphics object corresponding to a spoken index as the new text.

6. The electronic device of claim 1, wherein the preset word is not converted and displayed as text and is instead displayed as the object indicator.

7. The electronic device of claim 1, wherein the preset word further includes at least one of a voiceless sound, and an audio signal.

8. The electronic device of claim 1, wherein the controller is further configured to display the object indicator on the touchscreen for a predetermined amount of time and then stop displaying the object indicator after the predetermined amount of time has passed.

9. The electronic device of claim 1, wherein the controller is further configured to:
   receive a zoom-out input by a multi-touch on the text to create a gap between the text,
   wherein the gap is a space between a first word and a second word in the converted text,
   display the object indicator in the gap, and
   insert the new text at the gap.

10. The electronic device of claim 1, wherein the controller is further configured to auto-complete a character that can be inserted at a location where the object indicator is displayed, upon receiving a predetermined touch input on the object indicator.

11. The electronic device of claim 10, wherein the controller is further configured to display a plurality of candidate words on the touchscreen if a plurality of characters are to be inserted by the auto-completion.

12. The electronic device of claim 1, wherein the controller is further configured to:
   enter a mode for converting the voice input into text,
   activate the voice recognition module in the mode, and
   upon receiving a touch input for selecting at least a part of the converted text, deactivate the voice recognition module and enter a mode for editing the selected part of the converted text.

13. A method of controlling an electronic device, the method comprising:
- receiving, via a voice recognition module, a voice input when the voice recognition module has been activated;
- converting, via a controller, the voice input into text and displaying the converted text;
- displaying, via a touchscreen, an object indicator for editing a preset word included in the text upon recognizing the preset word while displaying the converted text on the touchscreen, wherein the preset word includes a prolonged sound,
- wherein the object indicator is a graphic user interface (GUI) serving as a guide for editing the preset word, and is displayed at a location where the preset word is recognized;
- receiving, via the controller, an input for selecting the object indicator;
- providing, via the controller, an editing option for changing the displayed object indicator into a new text to be displayed on the touchscreen; and
- displaying, via the touchscreen, the new text when the editing option is selected, the new text including a symbol corresponding to the prolonged sound.

14. The method of claim 13, wherein the preset word is not converted and displayed as text and is instead displayed as the object indicator.

15. The method of claim 13, wherein the preset word further includes at least one of a voiceless sound, and an audio signal.

16. The method of claim 13, further comprising:
- displaying the object indicator on the touchscreen for a predetermined amount of time and then stop displaying the object indicator after the predetermined amount of time has passed.

17. The method of claim 13, further comprising:
- displaying a window including at least one of a symbol, special character, and a graphics object to be inserted at the location where the object indicator is displayed.

18. The method of claim 17, further comprising:
- arranging and displaying said at least one of the symbol, special character, and graphics object in the window according to a predetermined priority order.

* * * * *